Figure 1:
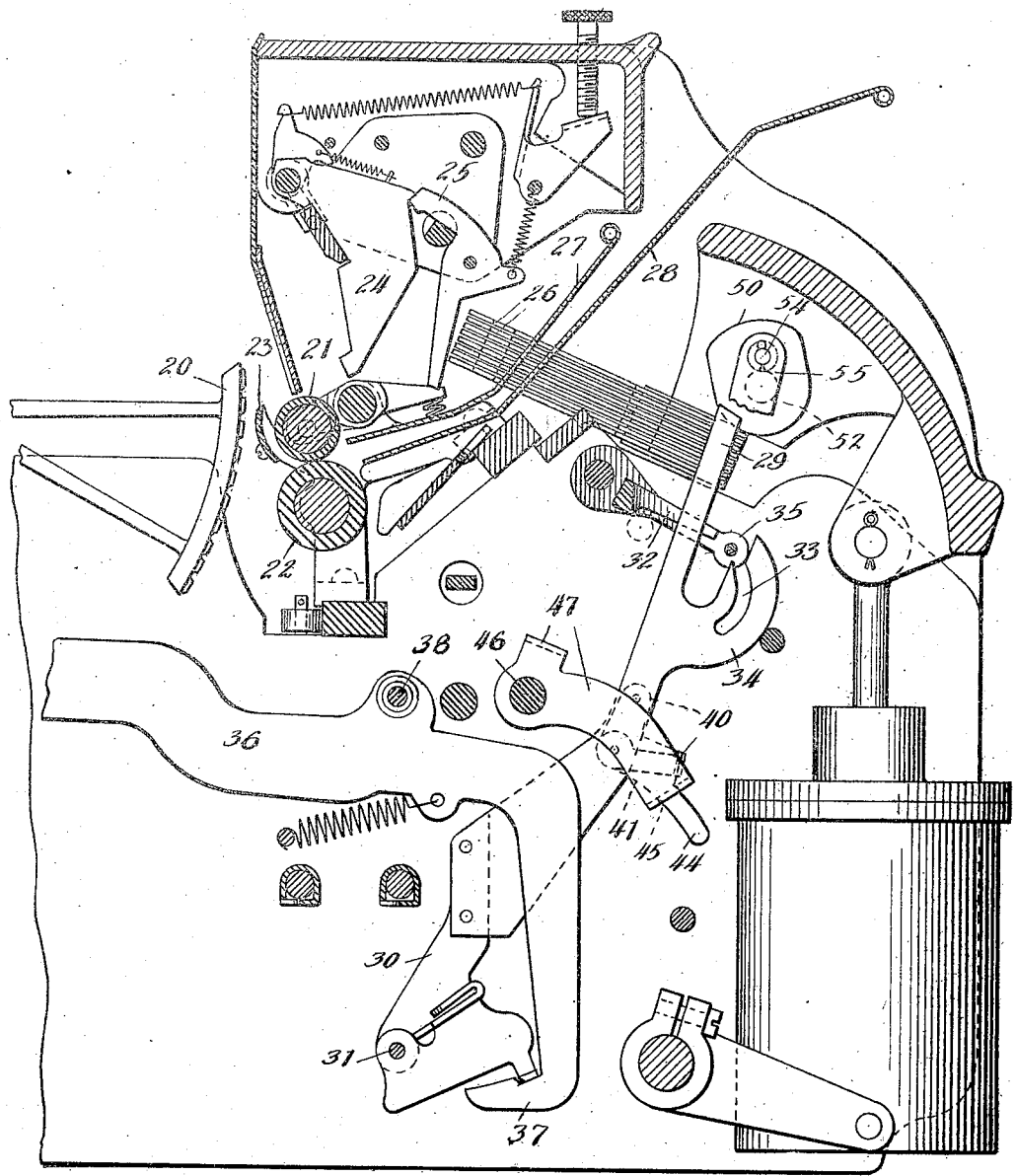

C. P. WETMORE & F. A. NIEMANN.
SELECTIVE CIPHER CUT-OUT FOR ADDING MACHINES.
APPLICATION FILED APR. 24, 1907.

1,127,832.

Patented Feb. 2, 1915.
6 SHEETS—SHEET 1.

Witnesses:

Inventors
Charles P. Wetmore
Frederick A. Niemann
By Munday, Evarts, Adcock & Clarke.
Attorneys

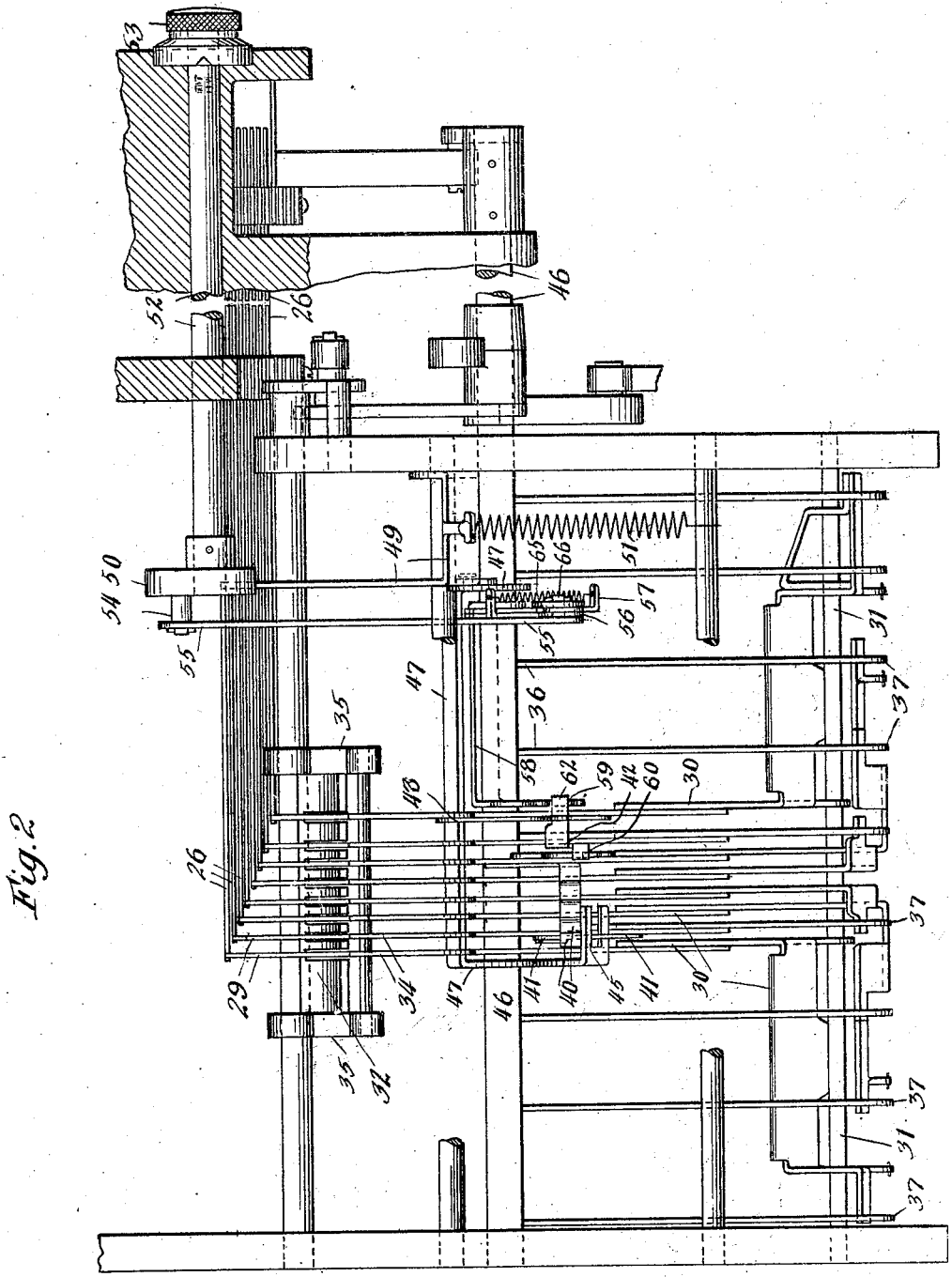

C. P. WETMORE & F. A. NIEMANN.
SELECTIVE CIPHER CUT-OUT FOR ADDING MACHINES.
APPLICATION FILED APR. 24, 1907.
1,127,332.
Patented Feb. 2, 1915.
6 SHEETS—SHEET 3.
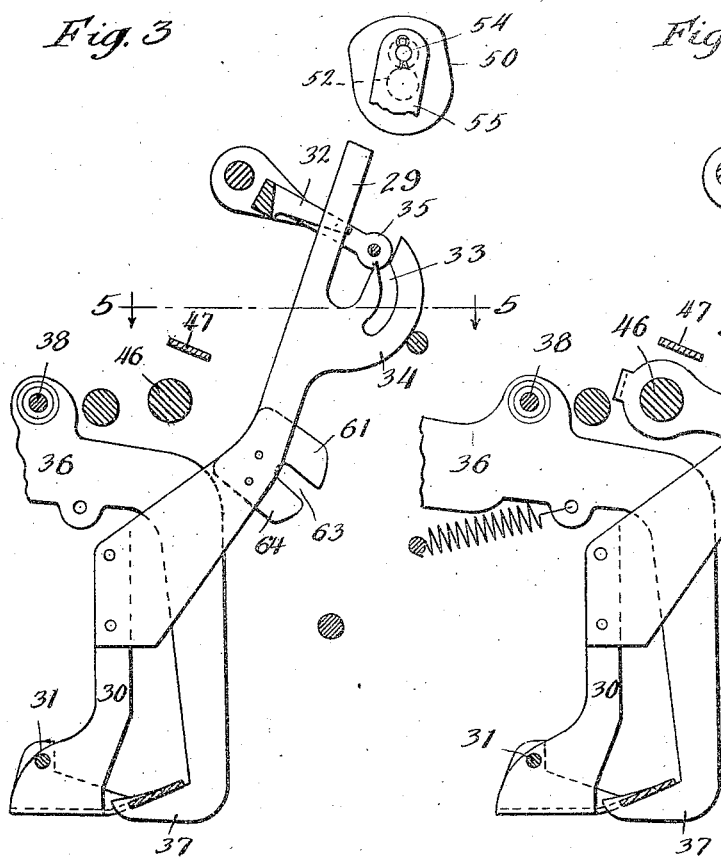
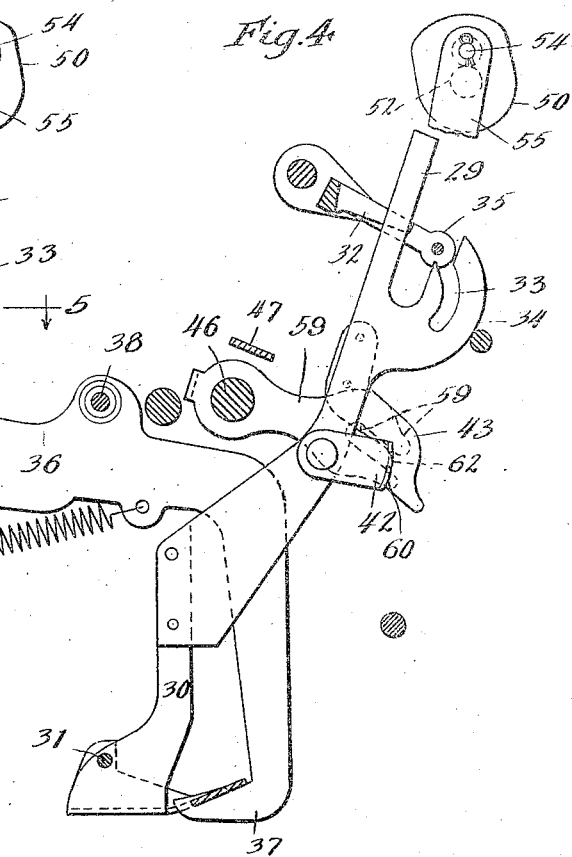
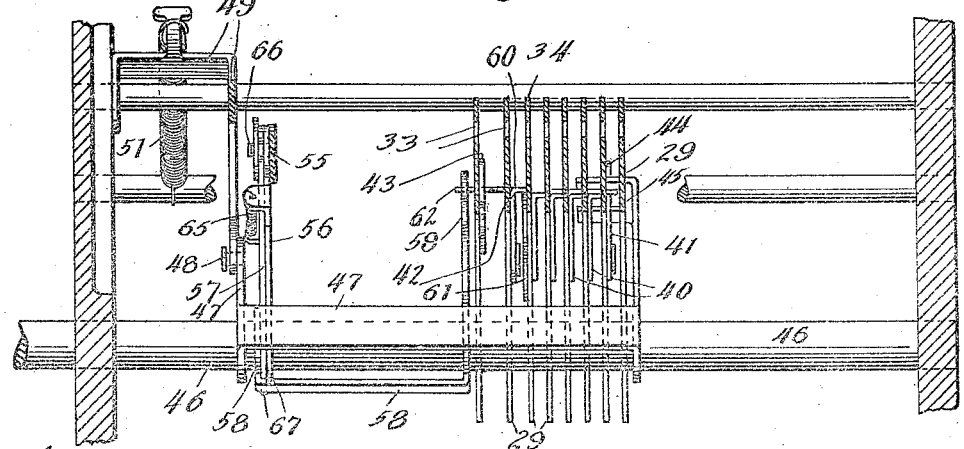
Witnesses:
Inventors
Charles P. Wetmore
Frederick A. Niemann
By Munday, Evarts, Adcock & Clarke
Attorneys C. P. WETMORE & F. A. NIEMANN.
SELECTIVE CIPHER CUT-OUT FOR ADDING MACHINES.
APPLICATION FILED APR. 24, 1907.
1,127,332.
Patented Feb. 2, 1915.
6 SHEETS—SHEET 4.
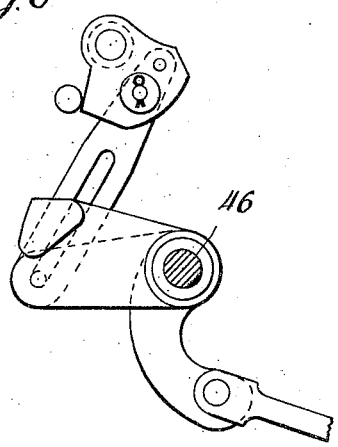
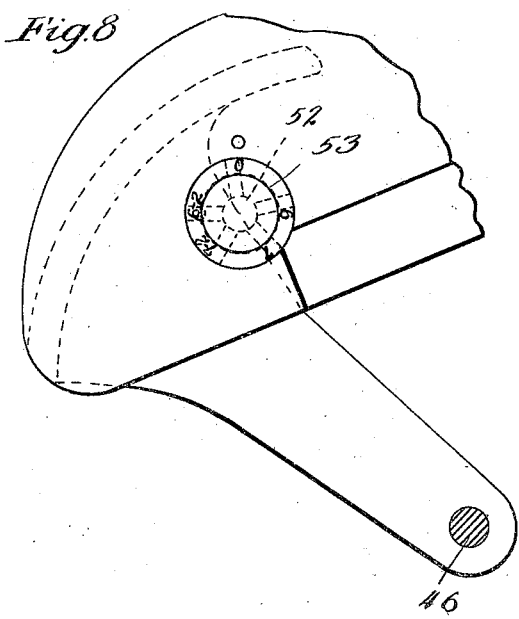
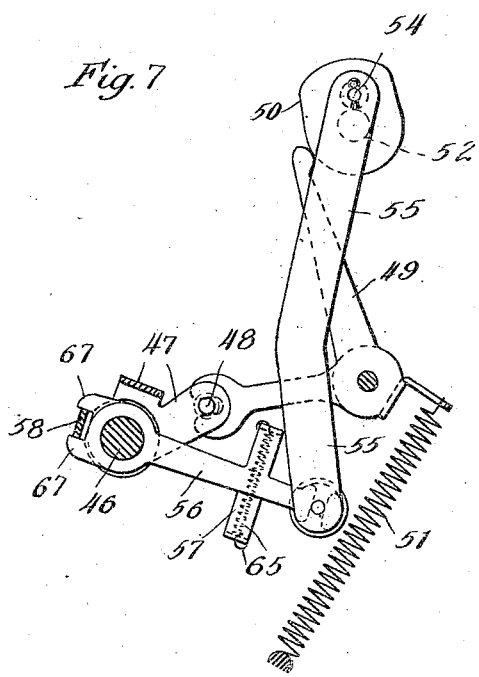
Witnesses:
Wm. Geiger
A. W. Munday
Inventors
Charles P. Wetmore
Frederick A. Niemann
By Munday, Evarts, Adcock & Clarke
Attorneys C. P. WETMORE & F. A. NIEMANN.
SELECTIVE CIPHER CUT-OUT FOR ADDING MACHINES.
APPLICATION FILED APR. 24, 1907.
1,127,332.
Patented Feb. 2, 1915.
6 SHEETS—SHEET 5.
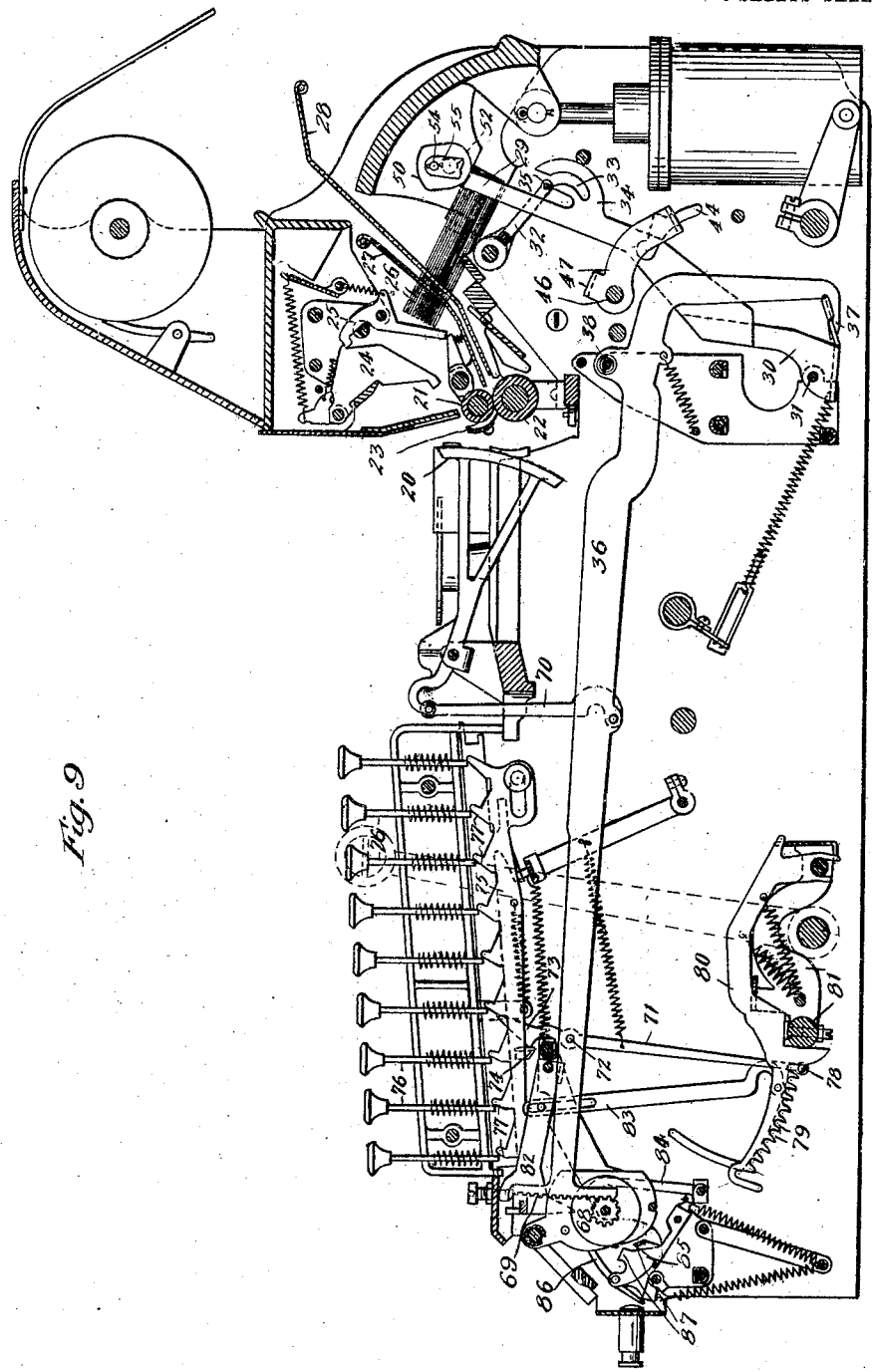

C. P. WETMORE & F. A. NIEMANN.
SELECTIVE CIPHER CUT-OUT FOR ADDING MACHINES.
APPLICATION FILED APR. 24, 1907.
1,127,332.
Patented Feb. 2, 1915.
6 SHEETS—SHEET 6.
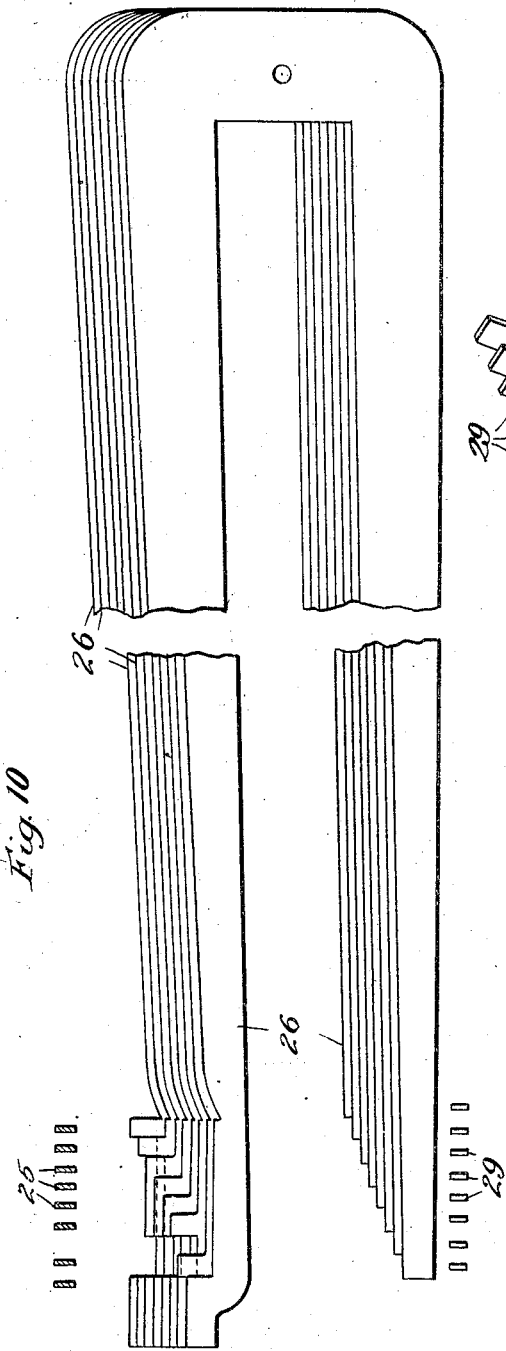
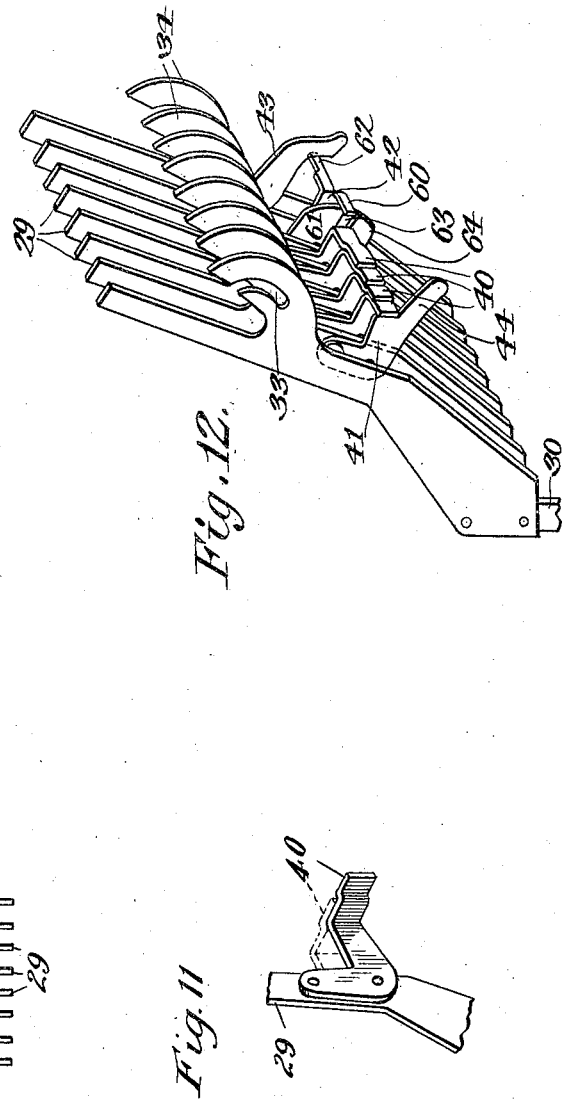
Witnesses:
Wm. Geiger
H. W. Munday
Inventors:
Charles P. Wetmore
Frederick A. Niemann
By Munday, Evarts, Adcock & Clarke
Attorneys

UNITED STATES PATENT OFFICE.

CHARLES P. WETMORE AND FREDERICK A. NIEMANN, OF CHICAGO, ILLINOIS, ASSIGNORS TO COMPTOGRAPH COMPANY, A CORPORATION OF ILLINOIS.

SELECTIVE CIPHER CUT-OUT FOR ADDING-MACHINES.

1,127,332.  Specification of Letters Patent.  Patented Feb. 2, 1915.

Application filed April 24, 1907. Serial No. 369,979.

*To all whom it may concern:*

Be it known that we, CHARLES P. WETMORE and FREDERICK A. NIEMANN, citizens of the United States, residing in Chicago, in the county of Cook and State of Illinois, have invented a new and useful Improvement in Selective Cipher Cut-Outs for Adding-Machines, of which the following is a specification.

Our invention relates to printing adding machines, and the particular embodiment of it here shown is indicated as applied to the printing adding machine commonly known as the comptograph, and generally shown in the various United States patents heretofore issued to Dorr E. Felt for printing adding machines and their mechanism, and more particularly shown in the patent to Felt and Wetmore, 853,543, issued May 14, 1907; and the object of our invention is to provide mechanism whereby the automatic filling in of ciphers to the right of any digit printed may be optionally presented to the right of either one or more, as the operator may select, of a plurality of the orders in the machine, to the end that the operator may at will and selectively divide the listing into either two or more parallel columns variously differing in relative width and printable simultaneously without lateral shifting of the paper in the machine.

Our invention has for further objects the effecting of such other improvements in structure and function as may be found to obtain in the devices hereinafter described or claimed.

In the accompanying drawings forming a part of this specification, Figure 1 is a vertical sectional view taken lengthwise through the rear portion of the machine, to show more particularly the printing mechanisms and indicate their connection with the adding mechanisms; Fig. 2 is a rear view of the cipher cut-out devices and the portion of the printing mechanism with which they more directly coöperate; Figs. 3 and 4 are fragmentary side views of parts of the cut-out mechanism and certain of the printing and adding mechanisms with which they more directly coöperate; Fig. 5 is a fragmentary sectional view on the line 5—5 of Fig. 3; Fig. 6 is a fragmentary side view of the mechanism for actuating the comb forming part of the printing mechanism shown in Figs. 4 and 5; Fig. 7 is a fragmentary side view showing the connections between the cut-out mechanism proper and the device for manually setting the same; Fig. 8 is a side view of the hand knob, shown in Fig. 2, for selectively setting the cut-outs; Fig. 9 is a vertical sectional view lengthwise of the machine to show the general relations of the adding and printing mechanisms; Fig. 10 is a partial diagrammatic view of the gang of U-bars, indicating their relation to the hammer pawls and the tips of the tail-piece levers; Fig. 11 is a perspective view showing two of the overlapping hooked clips 40 that coöperate to effect the normal cipher-printing action of the machine; and Fig. 12 is a perspective view of the entire cipher-transfer clip devices on the tail-piece levers.

Like reference numerals indicate like parts in all of the figures.

For each of the nine or more orders in the machine there is a type segment, such as 20, bearing the ten types "0," "1," "2," "3," "4," "5," "6," "7," "8," "9," and presenting the "0" at the printing line when in the normal position shown in Fig. 1. The paper held between the rollers 21, 22 projects upward between the type segments and the paper guide 23, and the said guide is provided with an opening, transverse of the printing line, so that the paper may be struck and impressed upon the type of any type segment 20 when the corresponding spring-actuated type-hammer 24 is released, there being one such hammer for each order. The hammer-resetting rock-arm sets the hammers back, after each printing operation, into the normal position shown in Fig. 1, and each hammer is held in such position, after the said rock-arm is withdrawn, by a spring-held hammer-pawl 25. These hammer pawls are released by the slight forward movement of the U-bars 26, of which there is a separate one for each pawl, each such U-bar being provided with a projection adapted to engage the free arm of its corresponding hammer pawl. The patent to Dorr E. Felt, No. 644,287, sets forth, at page 5 of its specification, the general operation of these U-bars, which are called "releasing-frames" in said patent. These U-bars pass around the paper guides 27, 28, through which the paper enters the machine, and are actuated, in their forward hammer-pawl releasing movement, by the tail-piece levers 29, one for each U-bar and arranged to engage therewith in the manner best shown in Fig. 2. These tail-piece levers 29 are rigidly secured to the tail-pieces 30 pivoted on the transverse rod 31, and such of them as are in any instance intended to engage the corresponding U-bars are actuated in two successive movements:—First, they are individually moved forward just far enough so that each shall engage the comb-bar 32 by means of a curved slot 33 in the arm 34 that projects rearward from each of said levers 29, and second, the said comb-bar 32, which extends transversely across all of the tail-piece levers and is held between the rock-arms 35, is rocked downward sufficiently to force forward all of the said tail-piece levers in whose curved slots 33 said comb-bar then happens to be engaged, thereby effecting just the proper forward movement of the said tail-piece levers to cause their upper ends to engage with and actuate the corresponding U-bars. The aforesaid patent to Felt No. 644,287, at page 5 of its specification, sets forth the general operation of said comb-bar, which is called a "cross-bar" in said patent. It is thus obvious that the first of these two elements in the forward movement of the tail-piece levers is the setting action that determines which of the U-bars shall be actuated and, hence, which of the hammer pawls shall be released and cause corresponding type impressions to be made upon the paper. And this initial setting-movement of the tail-piece levers is always effected in one or the other of two ways.

In the normal operation of the machine, the pulling of the hand crank or prime actuator moves some or all of the series of main adding levers 36, of which there is one for each order, the extent of movement of each of such levers 36 having been predetermined by the setting of a digit-key in the corresponding order of the key-operated mechanism; and if any key of a value of "1" or higher, is set in any order, it predetermines a just sufficient movement of the corresponding main lever 36 to effect, on the one hand, the proper movement of the adding mechanism and proper setting of the corresponding type segment 20, and also to effect, on the other hand, the first slight forward movement of the tail-piece above mentioned, each tail-piece being engaged by the hooked end 37 of the corresponding main lever 36 so that such tail-piece will be rocked forward on the pivot 31 when such main lever is rocked on its own pivot 38. Thus, if a key has been set in any order, the movement of the prime actuator will cause the main lever of that order not only to move the adding mechanism and set the type segment to the proper digit, but also to set forward the corresponding tail-piece lever 29 so that the latter will engage with and be actuated by the comb-bar 32 and effect the operation of the corresponding U-bar and hammer pawl. But if no key is set in any given order or orders, there will be no appreciable movement of the corresponding main lever or levers 36 to effect any of the results just specified, and consequently there will be no hammer-release, and no printing action, in such order or orders unless the tail-piece levers of such order or orders shall be moved forward to set position, to engage with the comb-bar, by means of other mechanism not thus far described. Such other mechanism is the automatic cipher-printing mechanism, whereby each tail-piece lever automatically engages the tail-piece lever of the next right hand order, so that when the setting of a digit-key in any order has caused, in the manner above described, the corresponding tail-piece lever to be set forward to printing position, the said tail-piece lever will in turn set forward the next right hand tail-piece lever if the latter has not been set through a movement of the main lever 36 in its own order,— and such setting of said next right hand lever would in turn and in like manner effect the setting forward of the next right hand lever, and so on to the end of the series. In this manner, the setting of any tail-piece lever to effect the printing of the digit-type that has been raised into position by the corresponding type segment causes all of the right hand or lower tail-piece levers, not so set, to be set forward to effect the printing of the ciphers normally presented at the printing line by the corresponding type-segments. This automatic filling in of the ciphers to the right of any digit printed, is effected, in the mechanism shown in the drawings, by a series of hooked clips 40 attached to the tail-piece levers, and so arranged that each such clip shall overlap the next lower or right hand one, with the result that the movement of any one of them will compel the simultaneous forward movement of all of the others to the right, that is, of lower order.

The foregoing description sets forth the normal automatic cipher-printing action, whereby the machine is enabled to print a single solid column of numbers, of any number of places within its capacity, filling in automatically all the necessary ciphers, notwithstanding that only the digit keys of significant value are set by the operator. But it is frequently desirable that, instead of printing such single solid column, the operator shall be enabled to print two or more narrower columns in the listing of two or more different kinds of items; and in order to separate such columns from each other it is of course necessary that the automatic cipher-printing shall be presented immediately to the right of each such narrow column to the left of the extreme right hand column. And it is desirable that the operator should be enabled thus to divide the listing at either one or more of several different places within the full series of type orders, so that the aforesaid narrow columns may at will be made of differing widths and positions. This selective and optional interruption of the automatic cipher-printing is effected by the combination of the above described mechanism with the following-described further devices.

In the orders that are intended to be effected, the hooked clips 40 are modified into the special forms 41, 42 and 43. For the purpose of cutting out the automatic cipher-transfer in the second order so that there shall be no transfer of movement, for automatic cipher-printing, immediately to the right of the third order, the special hooked clip 41 is pivoted instead of rigidly fixed on the tail piece lever of the second order, and is provided with a clip 44, engaging a forked crank-arm 45, whereby the said clip may be so shifted, on its pivot, as to be removed from engagement with the clip of next higher order and yet retain its engagement with a projection on the tail-piece lever of next lower order, so that when the said special clip is in this shifted position no movement can be transferred from the tail-piece lever of next higher order but any movement of the tail-piece lever to which the said clip is attached will be transferred to the tail-piece lever of next lower order, and, as a result, no printing action in the third order will occasion any cipher-printing in the second order, but any digit-printing in the second order will cause a cipher to be printed in the first order. The forked crank-arm 45, whereby the special clip 41 is shifted, is pivoted on the shaft 46 and is integral with the crank-piece 47, and the latter is pivotally secured at 48 to the crank-connection 49, actuated by the cam 50, with which it is held in contact by the spring 51. The said cam 50 is rigidly secured to the rod 52, and the latter is turned by means of the indexed thumb knob 53. The same cam 50 bears a crank pin 54, upon which is pivoted the further crank connection 55, and the latter actuates, through the auxiliary yielding connection 56—57, the further pivotal crank-piece 58 whose forked arm 59 engages and shifts the other special hooked clip 42 that is pivoted on the tail-piece lever of the seventh order. This said special clip 42 has two hooks projecting from it in opposite directions, one of said hooks, 60, normally engaging the notched heel-piece 61 that is secured to the tail-piece lever of the sixth order, and the other of said hooks being the arm 62 that both engages the forked crank-arm 59 and also passes under and normally engages the special hooked clip 43 that is rigidly secured to the tail-piece lever of the eighth order. When the aforesaid special pivoted clip 42 is shifted, by the crank-arm 59, to the extent of half of its possible movement, the hook-arm 62 is still in engagement with the inner face of the special hooked-clip 43, so that any movement of the tail-piece lever of the eighth order, which bears said hooked-clip 43, will still be transferred to the tail-piece lever of the seventh order, but the hook 60 is brought over the notch 63 in the heel-piece 61, thereby freeing the tail-piece lever of the sixth order, to which said heel-piece is secured, from any connection whatever with the tail-piece lever of the seventh order, with the result that the cipher transfer is interrupted from the seventh to the sixth order, although still retained between the eighth and the seventh orders. But a still further shifting of the pivoted special clip 42, to the full extent of its possible movement, will bring the hook-arm 62 entirely out from under engagement with the special hooked-clip 43 of the eighth order and will at the same time bring the hook 60 into engagement with the secondary heel 64 on the heel-piece 61 that is secured to the tail-piece lever of the sixth order, so that the transfer connection from the seventh order to the sixth order will now be restored, but the connection from the eighth order to the seventh order will be broken, and in this latter manner automatic cipher-printing will be interrupted in the seventh order, or immediately to the right of the eighth order, while retained immediately to the right of the seventh order. Thus, the extent to which the forked crank-arm 59 may be moved will determine whether the cipher-transfer is interrupted in the seventh order or in the sixth order, a half movement of such arm serving to interrupt it in the sixth order only, and a full movement of such arm serving to interrupt it in the seventh order only. The extent of movement of said crank-arm is of course determined through its connections with the above mentioned crank-pin 54 on the cam 50, and the movement of the latter is of course determined by the manual rotation of the indexed thumb knob 53. The said crank-pin 54 and the operative face of the cam 50 are so arranged and timed in relation to each other that the said crank-pin may be brought into position to actuate, through its connections, the cipher cut-out in either the sixth order alone or the seventh order alone, without in either case allowing the cam 50 to actuate, through its connections, the cipher cut-out in the second order. And the relative positioning and timing of the aforesaid crank-pin 54 and cam 50 is further so arranged that, upon still further rotation of the indexed thumb knob, the operator may cause the cam 50 to effect, through its connections, the cipher cut-out in the second order at the same time that the crank-pin 54, through its connections, effects the cipher cut-out in either the sixth order or the seventh order. Thus, the operator may at will effect a cipher cut-out in the sixth order alone or in the seventh order alone, or simultaneously in the sixth order and the second order, or simultaneously in the seventh order and the second order, or may restore the complete automatic cipher-printing throughout the entire series of orders in the machine. It is thus provided that the operator may at will and selectively effect a cipher cut-out in either one or more than one of a plurality of different places in the full printing width of the machine.

The cut-outs are here shown as applied at respectively the 2nd, the 6th and the 7th orders, because such distribution is in general a very convenient arrangement upon the ordinary standard adding machine having nine printing orders. But by a mere multiplication or duplication of the mechanism, provision may be made for effecting the cut-out action at any other order or orders. And it is equally obvious that the cut-out mechanism here provided may be applied to operate at any other positions, in the printing orders, as well as the 2nd, 6th or 7th orders.

The auxiliary yielding connection 56—57, referred to as interposed in the "6—7" cut-out connection, shown in Fig. 7 and also in Figs. 2 and 5, consists simply in a pair of reversely placed, or right and left, crank-arms 56 and 57, pivoted on the shaft 46 and having their hooked ends held together, by the springs 65, in engagement with the pivot pin 66 in the end of the crank connection 55, so that any movement of the said crank connection 55, in either direction, will be transmitted, through one or the other of said crank-arms 56 or 57, to the crank-piece 58, the latter being engaged by the reversely opposed tips 67 on the respective crank-arms 56 and 57. This auxiliary yielding connection results in causing the connection 55 to always effect the movement of the crank-piece 58, but permits the said crank-piece 58 to be moved independently of the said connection 55, and without straining the latter, when special clip 42 happens to be moved through the direct actuation of the tail-piece lever to which said clip is secured.

The sectional view Fig. 9 shows the general relations of the adding and printing mechanisms. Each of the series of main adding levers 36 performs the three-fold function of rotating the corresponding adding wheel 68, by means of the segment gear 69, of setting in position the type segment 20, by means of the connection 70, and of setting forward the tail-piece levers 29 so that their curved slots 33 will be engaged by the comb-piece 32 when the latter is subsequently rocked downward. The movement of the aforesaid main-lever 36 is effected through the main-lever connection 71 that is pivoted upon said main-lever at 72. This main-lever connection is provided at its upper end with a cam-arm 73, adapted to be in constant contact with and shifted by the cam-stud 74 on the sliding cam-bar 75, which latter is shifted to greater or less extent by the depression of one or another of the keys 76, each of said keys being arranged to impinge against and shift one of the series of cams 77 that project upward from and are integral with the aforesaid sliding cam-bar. The extent of the movement of the cam-bar is thus determined by the key that is depressed, and in turn determines the extent to which the cam-stud 74 shall swing back the cam-arm 73 of the pivoted main-lever connection 71; and the extent to which the said short or cam-arm of said connection is swung back determines the extent to which the long or lower arm of said pivoted connection shall be swung forward. The extreme free end of said long arm of said connection 71 carries the stud 78, and the extent to which said long arm is swung forward determines the engagement of said stud in one or another of the series of notches 79 in the forward end of the adding-arm 80 when the latter is rocked downward in the subsequent actuation of the machine. And the particular notch in which the aforesaid stud happens to engage, of course, determines the extent to which the main-lever 36 will be pulled down by its connection 71, upon the aforesaid rocking of the adding-arm 80. The adding-arm is secured to the main rock-shaft piece 81 and the rocking of said rock-shaft piece, upon the pulling of the operating handle of the machine, effects the movement of the adding-wheels and the positioning of the type-segments to the extent predetermined by the depression of the corresponding keys.

82 is the numeral wheel stop that checks the forward movement of the numeral wheel effected by the segment gear 69, said stop being actuated through the connection rod 83 whose lower end is pivotally secured to the forward end of the adding-arm.

84 is the back stop to prevent backward rotation of the numeral wheel. And the carrying from one numeral wheel to that of the next higher order is effected by the carrying-levers 85, with their carrying-pawls 86 and carrying-stops 87, operating in the well known manner of the identical devices shown in the hereinabove mentioned patent to Felt and Wetmore No. 853,543. The numeral wheel mechanism is of course duplicated as many times as there are orders in the machine.

Our invention is hereinabove set forth as embodied in a particular form of construction, but we do not limit it thereto or to less than all the possible forms in which the said invention, as hereinafter claimed, may be embodied and distinguished from prior devices.

The broad prior invention of an optionally operable cipher cut-out is set forth in the co-pending application of Wetmore, Serial No. 369,972, filed of even date herewith, but said application does not disclose the feature of a selective optionally operative cipher cut-out whereby the operator may at will select either one or more of a plurality of places, across the machine, at which to interrupt the automatic cipher transfer.

We claim:—

1. In a multiple-order adding-machine, in combination, adding and printing-mechanisms, automatic cipher-printing mechanism, and optionally operable means whereby the automatic cipher-transfer to the right of either of a plurality of orders may be prevented, substantially as specified.

2. In a multiple-order adding-machine, in combination, adding-mechanism, multiple-order printing-mechanism, automatic cipher-printing mechanism, and optionally operable coupling devices whereby the type-impression mechanisms of adjacent orders may be either coupled together or freed from each other at either of a plurality of positions across the printing-line of the machine, substantially as specified.

3. In a multiple-order adding-machine, in combination, adding-mechanism, printing-mechanism including the multiple spring-actuated type-hammers, automatic cipher-printing mechanism, and optionally operable coupling devices whereby the type-hammer release-mechanisms of adjacent orders may be either coupled together or freed from each other at either of a plurality of places across the printing-line of the machine, substantially as specified.

4. In an adding-machine, in combination, multiple-order adding and printing-mechanisms, automatic cipher-printing mechanism, and optionally operable means whereby the automatic cipher transfer to the right of each of a plurality of contiguous orders may be prevented, substantially as specified.

5. In an adding-machine, in combination, multiple-order adding and printing-mechanisms, automatic cipher-printing mechanism, and optionally operable means whereby the automatic cipher transfer to the right of either of a plurality of contiguous orders may be prevented, substantially as specified.

6. In a multiple-order adding-machine, in combination, adding and printing-mechanisms, automatic cipher-printing mechanism, and the optionally operable pivoted cut-out clip 41 with its manually controlled actuating devices, substantially as specified.

7. In a multiple-order adding-machine, in combination, adding and printing-mechanisms, automatic cipher-printing mechanism, and the optionally operable pivoted clip 42 with its manually controlled actuating devices, substantially as specified.

8. In a machine of the character described, the combination of a series of impression means coöperatively related for the printing of ciphers to right of numerals in decimal places where the amount to be recorded has no units, with provisions for discontinuing the coöperative relationship between adjacent members of the series of impression means; and manipulative means controlling said coöperative relationship and adjustable to effect discontinuance thereof between one or another pair of adjacent members of the series of impression means.

9. In a machine of the character described, the combination of a series of separately acting impression devices; movable couplers between the members of said series for securing coöperative action between the same in the printing of ciphers; and means for selectively displacing said couplers.

10. The combination with hammers and independently movable hammer-controlling members of a recording mechanism; of couplers pivotally mounted on certain of said members respectively for connection with and disconnection from adjacent members.

11. The combination with transfer elements of a recording mechanism, of contact blades pivoted to said elements, each blade movable into and out of position to engage the adjacent element.

12. In a printing adding machine, optionally operable mechanism for interrupting the automatic cipher-printing to the right of any order or simultaneously of several orders in the machine, substantially as described.

13. In recording mechanism, the combination of hammers, independently movable hammer-controlling members, and a coupler pivotally mounted on one such member and arranged to be operated upon by an adjacent member whereby the latter when operated operates the member carrying the coupler.

14. In recording mechanism, the combination of hammers, independently movable hammer-controlling members, and a coupler pivotally mounted on one such member and arranged to be operated upon by an adjacent member, the coupler having a laterally projecting stud normally extending under a shoulder of the said adjacent member.

15. In recording mechanism, the combination of hammers, independently movable hammer-controlling members, a coupler pivotally mounted on one such member and arranged to be operated upon by an adjacent member whereby the latter when operated operates the member carrying the coupler, and a key and connections for displacing the coupler at will.

16. In recording mechanism, the combination of hammers, independently movable hammer-controlling members, a coupler pivotally mounted on one such member and arranged to be operated upon by an adjacent member whereby the latter when operated operates the member carrying the coupler, a pivoted finger in operative relation to the coupler, and a key applied to said finger.

17. In a printing adding-machine, movable connections normally coupling in series of printing devices of several orders, to effect automatic cipher-printing, each of said connections being displaceable at the will of the operator, to effect optional interruption of the automatic cipher-printing to the right of any order or simultaneously of several orders in the machine, substantially as described.

CHARLES P. WETMORE.
FREDERICK A. NIEMANN.

Witnesses:
H. A. LEAM,
L. J. OTTEN.

Copies of this patent may be obtained for five cents each, by addressing the "Commissioner of Patents, Washington, D. C."

---

Correction in Letters Patent No. 1,127,332.

It is hereby certified that in Letters Patent No. 1,127,332, granted February 2, 1915, upon the application of Charles P. Wetmore and Frederick A. Niemann, of Chicago, Illinois, for an improvement in "Selective Cipher Cut-Outs for Adding-Machines," an error appears in the printed specification requiring correction as follows: Page 1, line 23, and page 2, line 127, for the word "presented" read *prevented;* and that the said Letters Patent should be read with this correction therein that the same may conform to the record of the case in the Patent Office.

Signed and sealed this 6th day of April, A. D., 1915.

[SEAL.]

J. T. NEWTON,

*Acting Commissioner of Patents.*